C. LORBER.
BREAD SERVER.
APPLICATION FILED JAN. 6, 1922.
1,418,153.
Patented May 30, 1922.
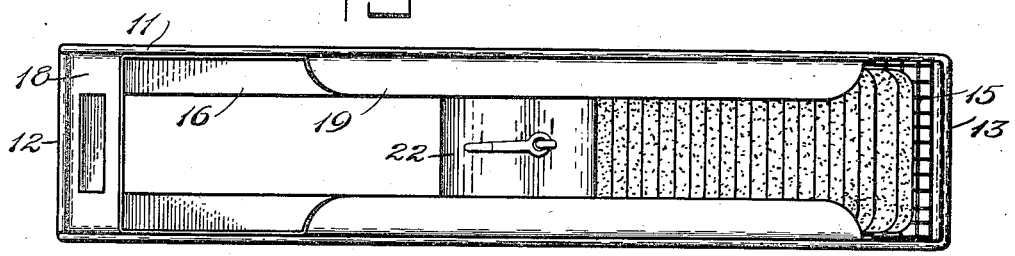
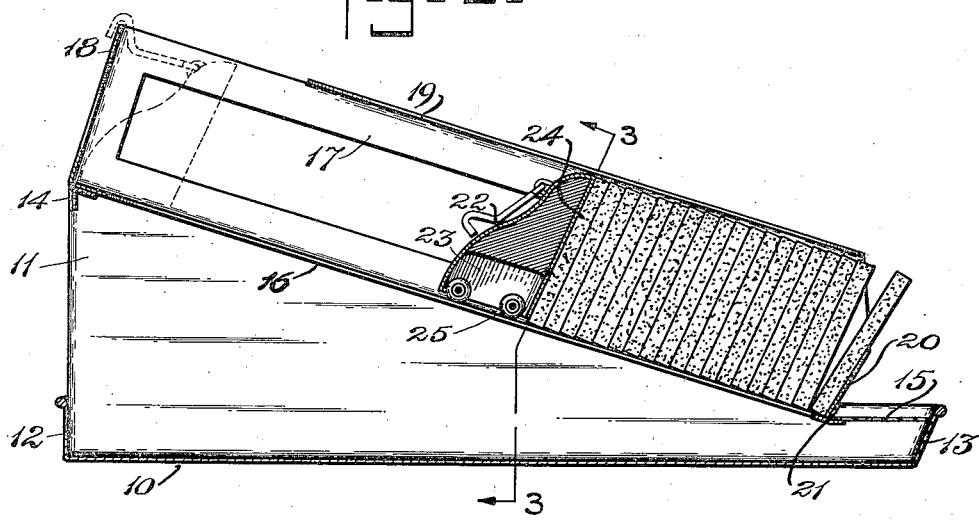
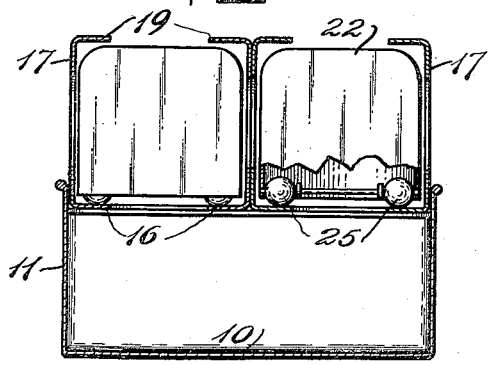
Inventor
Charles Lorber
By
Attorney

UNITED STATES PATENT OFFICE.

CHARLES LORBER, OF LOUISVILLE, KENTUCKY.

BREAD SERVER.

1,418,153.                    Specification of Letters Patent.    Patented May 30, 1922.

Application filed January 6, 1922. Serial No. 527,359.

*To all whom it may concern:*

Be it known that CHARLES LORBER, a citizen of the United States, residing at Louisville, in the county of Jefferson and State of Kentucky, has invented certain new and useful Improvements in Bread Servers, of which the following is a specification.

This invention relates to dispensing devices and has special reference to a bread serving device.

One important object of the invention is to improve the general construction of devices of this character.

A second important object of the invention is to provide an improved bread serving device in which the sliced bread may be placed and from which the slices may be manually withdrawn one by one without in any way disarranging or interfering with the remaining slices of bread.

A third object of the invention is to provide an improved bread serving device wherein the bread is thoroughly protected from dust and in which handling of the bread by picking over the slices is positively prevented.

A fourth object of the invention is to provide a device of this character in which the end slice of a series of slices of bread will be positioned for ready grasping by a person desiring bread, the remaining slices being in such position as to prevent more than one slice being withdrawn at a time without great inconvenience of manipulation.

A fifth object of the invention is to provide a device of this character wherein simple and convenient means will be employed for feeding the slices successively into position for grasping, the means being of novel and improved character.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a plan view of the improved bread serving device.

Figure 2 is a vertical longitudinal section therethrough.

Figure 3 is a section on the line 3—3 of Figure 2.

In carrying out this invention in the embodiment illustrated there is provided an outer tray or casing having a bottom 10 and substantially triangular side walls 11. At the rear end there is a low rear wall 12 perpendicular to the bottom 10 while at the front end is a lower front wall 13 which is inclined forwardly. The upper rear corners of the side walls 11 are connected by a cross brace 14 while across the front between the side walls is a perforated or reticulated tray or plate 15.

The inner or bread holding casing is provided with a bottom 16, sides 17 and rear 18. These sides, bottom and rear are open in the center as can be clearly seen from reference to Figures 1 and 2 and it is to be noted that there may be either one of these bread holding members or a plurality of the same employed, the outer tray being of appropriate width in each instance to accommodate the desired number of the bread holders. Each bread holder is in like manner provided at its top with inwardly extending flange portions 19 which terminate short of the rear wall 18 so that an open space is left in the rear end of the bread holder for loading the same. At the front of the bread holder there is provided a front wall 20 of somewhat less than half the height of the side walls and this front wall is inclined forwardly. Also the front of each bread holder is provided with a transverse angled member 21 which engages on the reticulated plate 15 as shown in Figure 2 to support the front end of the device. In each of the bread holders is mounted a pusher block consisting of a casing 22 which is provided with a weight 23 so disposed that it extends somewhat along the curved rear part of the casing and also along the bottom end a short distance up the straight side or front 24 of said casing. These followers are mounted on ball rollers 25 so that they readily move down the inclined bottom 16 of the respective bread holder. It will be seen that by reason of the peculiar arrangement of the weight on the follower casing pressure is exerted only on the crust of the bread to any extent and consequently the slices of bread are not crushed by the follower.

In use the bread is sliced either by hand or by suitable slicing machines and inserted in the proper bread holder from the top rear part thereof, the follower being moved to the rear end of the bread container for this purpose. The holder having been filled it is placed in the outer tray in the position shown in Figure 2. The slices of bread at the front will, owing to the inclination of the side 20 tilt forward as shown so that it may be readily grasped. The remainder of the bread will be protected by the sides and top of the container. Whenever the front slice of bread is removed the follower will force the rear of the bread down until the last slice takes position as the front slice.

From the foregoing it will be seen that the bread is kept in a clean and neat condition and that by widening the bottom or outer tray as many different kinds of bread may be served as may be desired. It will also be noted that when the service of bread is dispensed with the container may be lifted from its position shown in Figure 2 and deposited in the bottom of the outer tray. Any crumbs falling off of the front slice of bread will not accumulate on the reticulated plate 15 but will drop through and thus there will be no unsightly collection of crumbs and scraps of crust.

There has thus been provided a simple and efficient device of the kind described and for the purpose specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

1. In a device of the kind described, a bread container having a forwardly inclined front wall extending from the bottom towards the top and the said container being open in the front above said front wall, means to support the container in an inclined position with the front lower than the rear, means within the container for urging sliced bread to the front thereof, a housing for said container wherein the container may be rested, and means in the housing for supporting the container removably in an inclined position.

2. In a device of the kind described, a bread container having a forwardly inclined front wall extending from the bottom towards the top and the said container being open in the front above said front wall, means to support the container in an inclined position with the front lower than the rear, means within the container for urging sliced bread to the front thereof, said means being arranged to exert pressure on the crust of the bread at the lower part of the slice, a housing for said container wherein the container may be rested, and means in the housing for supporting the container removably in an inclined position.

3. In a device of the kind described, a bread container having a forwardly inclined front wall extending from the bottom towards the top and the said container being open in the front above said front wall, means to support the container in an inclined position with the front lower than the rear, and means within the container for urging sliced bread to the front thereof, said last mentioned means comprising a follower movable longitudinally of the container, balls rotatably mounted in the bottom of the follower and resting on the bottom of the container and a weight disposed in the lower part of said follower.

In testimony whereof I affix my signature.

CHARLES LORBER.